(12) United States Patent
Uratani et al.

(10) Patent No.: US 7,412,573 B2
(45) Date of Patent: Aug. 12, 2008

(54) STORAGE DEVICE AND DEVICE CHANGEOVER CONTROL METHOD FOR STORAGE DEVICES

(75) Inventors: Ikuo Uratani, Hadano (JP); Kiichiro Urabe, Isehara (JP); Dai Taninaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 10/983,747

(22) Filed: Nov. 9, 2004

(65) Prior Publication Data

US 2006/0059308 A1    Mar. 16, 2006

(30) Foreign Application Priority Data

Sep. 16, 2004    (JP) ............... 2004-269101

(51) Int. Cl.
    *G06F 12/00* (2006.01)
(52) U.S. Cl. ................. 711/154; 711/114; 711/202
(58) Field of Classification Search ............ 711/154, 711/114, 202
    See application file for complete search history.

(56) References Cited

U.S. PATENT DOCUMENTS

| | | | |
|---|---|---|---|
| 5,611,069 A | 3/1997 | Matoba | |
| 6,484,245 B1 * | 11/2002 | Sanada et al. ............... | 711/164 |
| 6,571,354 B1 | 5/2003 | Parks et al. | |
| 2002/0087780 A1 * | 7/2002 | Selkirk et al. ................. | 711/6 |
| 2002/0184463 A1 * | 12/2002 | Arakawa et al. ............ | 711/170 |
| 2003/0196002 A1 * | 10/2003 | Nakayama et al. ............. | 710/1 |
| 2003/0204701 A1 * | 10/2003 | Mimatsu et al. ............. | 711/203 |
| 2004/0054648 A1 | 3/2004 | Mogi et al. | |
| 2005/0149656 A1 * | 7/2005 | Seto ........................... | 710/105 |

FOREIGN PATENT DOCUMENTS

| | | |
|---|---|---|
| EP | 0785500 | 7/1997 |
| EP | 1357476 | 10/2003 |
| EP | 1548563 | 6/2005 |
| JP | 7-129331 | 5/1995 |

* cited by examiner

*Primary Examiner*—Gary J Portka
*Assistant Examiner*—Yong J. Choe
(74) *Attorney, Agent, or Firm*—Antonelli, Terry, Stout & Kraus, LLP.

(57) ABSTRACT

The present invention makes it possible to change over a volume transparently with respect to a host. A first storage device 2A and a second storage device 2B are connected through a communication network 3B; a volume 8 provided by the second storage device 2B is mapped as a volume of the first storage device 2A. A host 1 is capable of accessing either of the volume 6 or volume 8 via a virtual LU 4. A connection control unit 5, which may be constructed of tables or the like, connects the virtual LU 4 to either one of volume 6 and volume 8. Changeover of the connection target is performed transparently with respect to the host 1 and so is not recognized by the host 1. Consequently, the actual data storage target volume can be changed over while the host 1 always accesses the same virtual LU 4.

17 Claims, 16 Drawing Sheets

FIG. 5A

LUN-VDEV MAPPING TABLE (T1)

| VDEV# | DEVICE INFORMATION ||| PATH INFORMATION ||
| --- | --- | --- | --- | --- | --- |
| | DEVICE IDENTIFICATION INFORMATION | CAPACITY (Kbyte) | DEVICE TYPE | WWN | LUN |
| 0 | | 657,455 | | | |
| 1 | | 89,854 | | | |
| 2 | | — | | | |
| 3 | | 5,544,223 | | | |

FIG. 5B

LUN-LDEV-VDEV CONVERSION TABLE (T2)

| LUN# | LDEV || VDEV# ||
| --- | --- | --- | --- | --- |
| | # | MAX SLOT NUMBER | # | MAX SLOT NUMBER |
| 0 | 3 | 10000 | 1 | 50000 |
| 1 | 1 | 40000 | | |
| 2 | 4 | 50000 | 4 | 50000 |

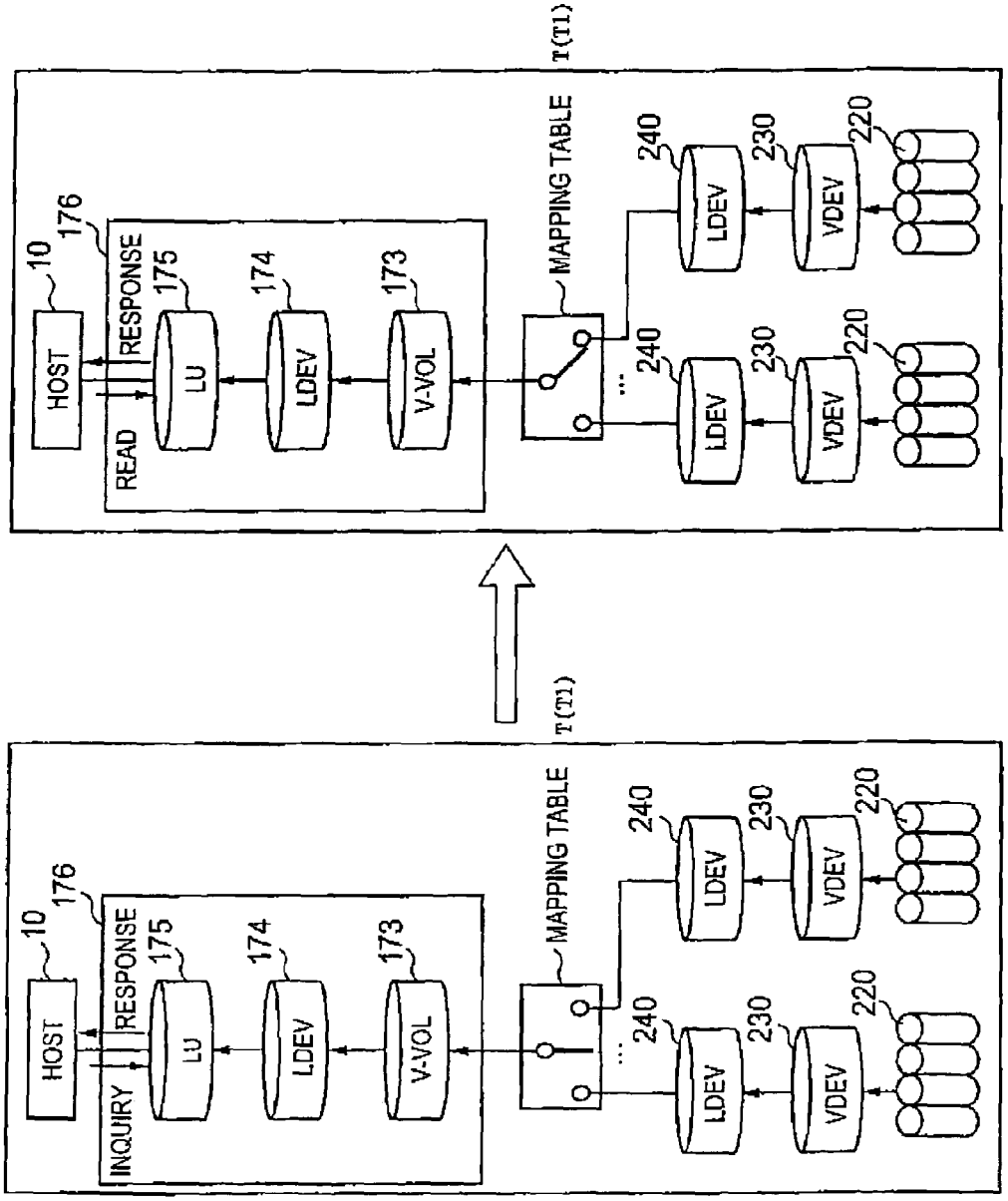

STORAGE DEVICE AND DEVICE CHANGEOVER CONTROL METHOD FOR STORAGE DEVICES

CROSS-REFERENCE TO RELATED APPLICATIONS

This application relates to and claims priority from Japanese Patent Application No. 2004-269101 filed on 16th Sep. 2004, the entire disclosure of which is incorporated herein by reference.

BACKGROUND OF THE INVENTION

1. Field of the Invention

The present invention relates to a storage device and a device changeover control method for storage devices.

2. Description of the Related Art

As a storage device, there may be provided a storage region using a RAID (Redundant Array of Independent Inexpensive Disks) in which disk drives such as for example hard disk drives or semiconductor memory devices are arranged in array fashion. A host computer (hereinbelow called "host") performs data reading and writing by accessing a logical storage region provided by the storage device.

A storage device is required to have high usability and high reliability. To achieve this, it is known to protect against occurrence of faults by constituting a disk array using a plurality of mirror disks that mirror the current disk and standby disk (Laid-open Japanese Patent Application No. H. 7-129331). In the technique disclosed in this reference, when it is anticipated that a fault may occur, the disk that is the source of data reading is arranged to be changed over from the current disk to the standby disk. It should be noted that the technology disclosed in this reference merely discloses respective mirroring simply of the various constituent elements of the disk array; it does not disclose changeover of a volume logically provided on a physical storage region.

The host may change over the volume (LDEV: logical device that is used for various reasons. When an LDEV is changed over, the currently used LDEV and the LU (logical unit) must be disconnected and a new LDEV connected with this LU. However, since the LU that is disconnected from the LDEV temporarily loses recognition from the host, during the period until the changeover of LDEV is completed, recognition of the LU by the host is temporarily interrupted.

If fault monitoring software or the like is operating on the host, there is a possibility that the interruption of recognition of the LU during LDEV changeover may be detected by the fault monitoring software as occurrence of a path fault. Also, if the host OS is Windows (registered trademark), the interruption of recognition of the LU during LDEV changeover may cause so-called PnP (plug-and-play) to occur.

Accordingly, if an LDEV changeover operation is performed during execution of a data processing task by the host, there is a possibility that the disconnection of the LU and the LDEV by this changeover operation will be recognized by the host and may affect the task of data processing on the host.

SUMMARY OF THE INVENTION

Accordingly, an object of the present invention is to provide a storage device and a device changeover control method for storage devices whereby the data storage target device may be changed over without the host device being aware of this. One object of the present invention is to provide a storage device and a device changeover control method for storage devices whereby it is possible to automatically change over a volume inside or outside the storage device without being detected by the host device. Further objects of the present invention will become apparent from the description of the following embodiments.

In order to solve the above problem, a storage device according to the present invention comprises at least one or more access target devices that are recognized as access targets for input/output of data from a host device, data storage target devices that store data in respect of the access target device and that are connected with the access target devices, and a connection control unit that controls the connection condition of the access target devices and the data storage devices, wherein the connection control unit connects a prescribed data storage target device selected from the data storage target devices with an access target device.

If for example the host is an open system host on which are mounted a general purpose operating system and general purpose communication protocol, the access target devices are logical units (LUs). Also, if the host is a main frame machine, the access target devices are logical devices (LDEVs). It should be noted that the data storage target devices could be set up at intermediate devices. Also, these intermediate devices could be set up on a storage region provided by a plurality of physical devices that store respective data.

The connection control unit may control the connection condition in accordance with at least two types of condition, namely, a first condition, in which an access target device is connected with a prescribed data storage target device, and a second condition, in which the access target device is not connected with any of the data storage target devices. The second condition may be handled as an intermediate condition prior to achieving the first condition. When a data storage target device that is connected with an access target device is changed over, the connection condition changes in the sequence: first condition → second condition → first condition.

Even when access target device is placed in the second condition i.e. even when the access target device and data storage target device are not connected, the access target device is still capable of responding to prescribed commands from the host device. Examples of such prescribed commands include state confirmation commands (sensing commands) such as an inquiry command or READDEVCHAR command. As an example of a configuration that makes possible response to sensing commands, the method may be considered of providing a permanently fixed connection of a formal volume to an access target device. A configuration is also possible in which an access target device is constituted as a virtual LU comprising a logical device and an intermediate virtual device connected with this logical device. A virtual intermediate device does not directly have a storage region for storing data, but constitutes a virtual volume in which only the existence of such data is logically defined.

It is not necessary that all of the plurality of data storage target devices should be provided within the same storage device and at least some of the data storage target devices could be provided in another storage device. For example, a first storage device and a second storage device could be connected using a network and the volume on which the second storage device is provided could be mapped to an intermediate device of the first storage device. In this way, the first storage device can appear to employ the volume of the second storage device as if it were a volume under its own control. Accordingly, if desired, the plurality of data storage target devices may all be present on another storage device. In this case, the first storage device may for example be constituted as an intelligent switch or the like.

At least some of the means, functions and steps of the present invention may be embodied as a computer program read and executed by a microcomputer. Such a computer program may be distributed by being fixed on a storage medium such as for example a hard disk or optical disk. The computer program may also be provided through a communication network such as the Internet.

BRIEF DESCRIPTION OF THE DRAWINGS

FIG. 5 shows examples of tables used for changeover of a volume in a storage device; FIG. 5(a) shows a table for performing mapping of the V-VOL (VDEV) and LUN and FIG. 5(b) shows a table for associating the LUN and LDEV and V-VOL (VDEV) constituting a virtual LU, respectively;

FIG. 9 shows diagrams illustrating how changeover of a volume connected with a virtual LU is effected.

FIG. 10 is a continuation diagram of FIG. 9; FIG. 10(a) shows the condition once the connection of the virtual LU and the volume has been released and FIG. 10(b) shows the condition when another volume is connected with the virtual LU, respectively;

DESCRIPTION OF THE PREFERRED EMBODIMENTS

Figure 1:
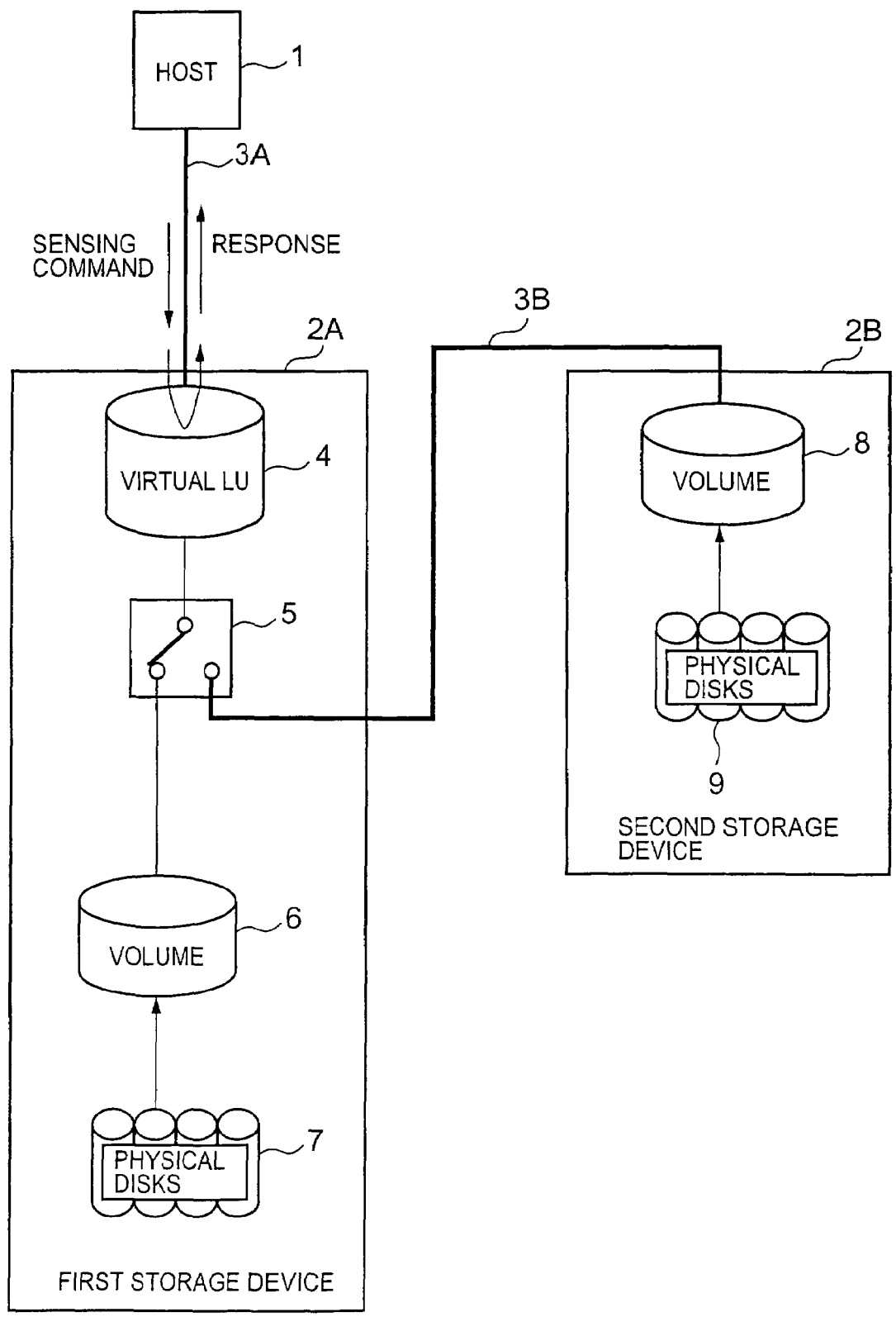
FIG. 1 is a diagram showing the concept of an embodiment of the present invention.

An embodiment of the present invention is described below with reference to the drawings. FIG. 1 is a diagram showing schematically the overall concept of this embodiment. As described below, this embodiment discloses a device changeover control method of a storage device 2A capable of employing a plurality of data storage target devices 6, 8. This storage device 2A is connected in a manner whereby it can be changed over between amount point and anyone data storage device selected from the data storage target devices 6, 8, in a condition with connection maintained between the mount point and a host 1, the mount point being fixed on the host 1.

In more detail, a storage system according to the present invention is constituted by connecting a first storage device 2A and a second storage device 2B in a manner such that they are capable of communicating through a communication network 3B. The host 1 and the first storage device 2A are connected through a communication network 3A.

The communication network 3A depends on the type of host 1. For example, in the case where the host 1 is a so-called open system host, the host 1 and the first storage device 2A maybe connected through a LAN (local area network), SAN (storage area network), the Internet or a private circuit or the like. In the case of a LAN connection, data exchange is conducted using TCP/IP (Transmission Control Protocol/Internet Protocol) and, in the case of a SAN connection, data exchange is conducted using the fiber channel protocol (FCP). In the case where the host 1 is a mainframe, data transfer is conducted using a transmission protocol such as for example FICON (Fiber Connection: registered trademark), ESCON (Enterprise System Connection: registered trademark), ACONARC (Advanced Connection Architecture: registered trademark) or FIBARC (Fiber Connection Architecture: registered trademark).

The communication network 3B that connects the storage devices 2A, 2B may be constituted for example as a LAN or SAN. The communication network 3A and the communication network 3B could be constituted as respectively distinct networks or both of these could be constituted as the same network.

As a typical hardware configuration, the first storage device 2A may comprise for example an upper level interface control unit (see FIG. 2) that controls data exchange with the outside (host 1 or the second storage device 2B), a lower level interface control unit (see FIG. 2) that respectively controls data exchange with a group 7 of a plurality of physical devices for storing data, and a memory unit (see FIG. 2) shared by the upper level interface control unit and lower level interface control unit.

Regarding the logical structure of data storage, the first storage device 2A may comprise for example at least one or more data storage target devices (logical devices) 6 provided on a storage region provided by the physical device group 7, a connection control unit 5 and a virtual LU 4.

The connection control unit 5 connects one or other of the logical devices (denoted in FIG. 1 as "volumes") 6, 8 that are directly or indirectly under the control of the first storage device 2A with the virtual LU 4 in response to changeover instructions which the connection control unit 5 receives as input.

The virtual LU 4 is recognized as a subject of access for data input/output from the host 1. The virtual LU 4 maintains a connected condition with the host 1 so long as the host 1 continues to use the virtual LU 4. Thus, the virtual LU 4 responds to sensing commands from the host 1 even when the virtual LU 4 is connected with neither of the logical devices 6, 8.

Consequently, when seen from the host 1, connection of the virtual LU 4 and logical devices 6 and 8 can be changed over without making any change in the point (virtual LU) of mounting on the host 1.

1. First Embodiment

Figure 2:
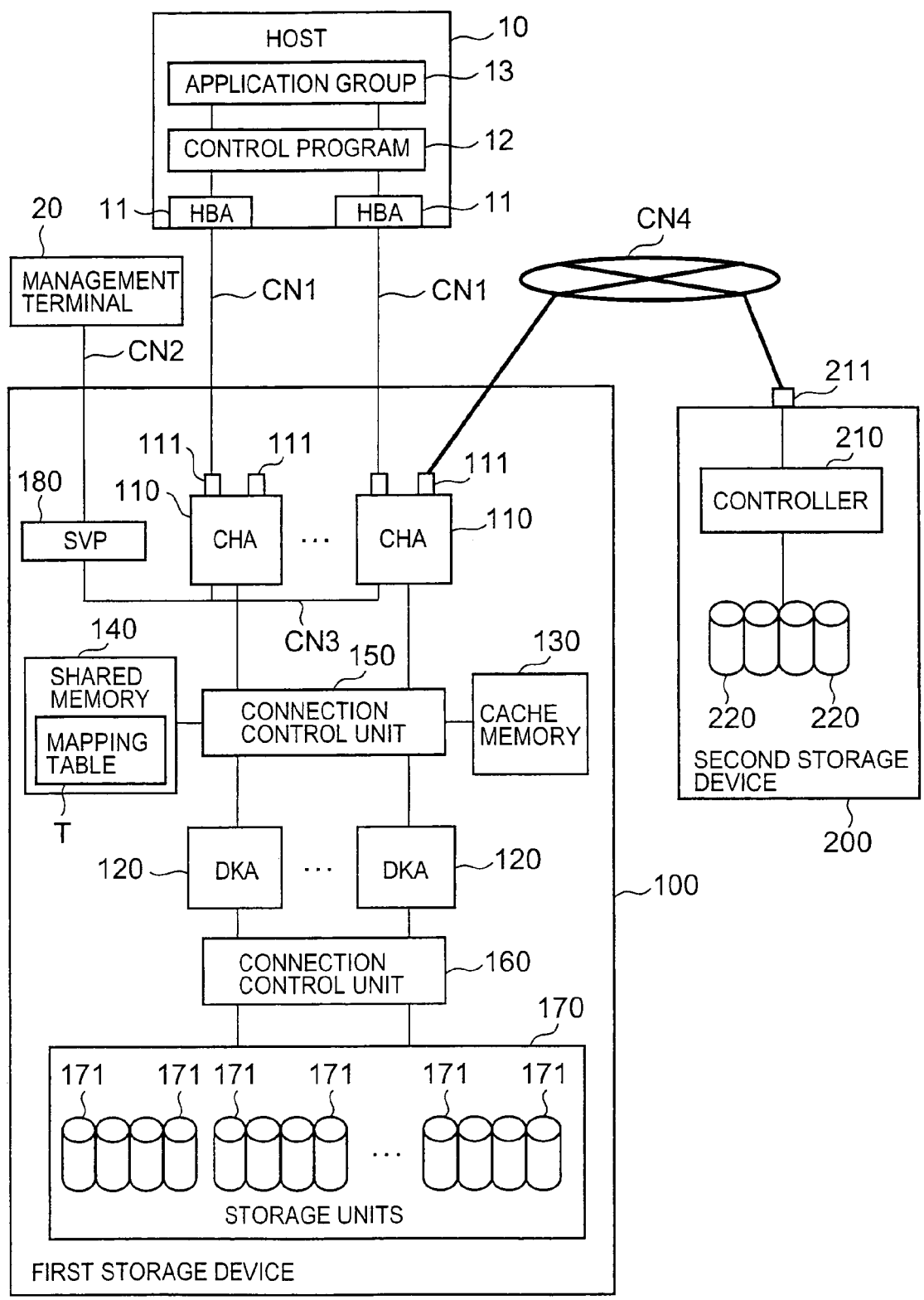
FIG. 2 is a block diagram of the storage system.

FIG. 2 is a block diagram showing schematically the overall layout of a storage system. This storage system comprises for example a host 10, management terminal 20, a first storage device 100 and a second storage device 200, as will be respectively described.

Although only one host is shown in the drawings, a plurality of hosts 10 may be provided. The host 10 may be embodied as a computer system such as for example a server, personal computer, workstation, mainframe or mobile information terminal. For example, a plurality of open system hosts and a plurality of mainframe hosts may be connected to the same storage system.

The host 10 may comprise for example an HBA (host bus adaptor) 11, control program 12, and application program group (abbreviated in the Figure to "application group") 13.

The HBA 11 is responsible for data communication with the storage device 100; the host 10 is connected with the communication port of the storage device 100 through a communication network CN1 from the HBA 11. The host 10 may comprise a plurality of HBAs 11. The communication network CN1 may be for example a LAN, SAN, Internet or private circuit. In the case of an open system host, data exchange is performed with the storage device 100 using a protocol such as TCP/IP or FCP, or iSCSI (Internet Small Computer System Interface), for example. In the case of a mainframe host, a specialist protocol as such as ESCON or FICN may be employed.

The control program 12 performs for example path control. The control program 12 performs control to change over to a path that is operating normally if for example some fault occurs on any of the path. Alternatively, the control program 12 distributes the load to another path if an overload condition is generated on any of the path.

The application group 13 are programs that execute various types of information processing service such as for example electronic mail processing or accounts processing. The application group 13 for example provides information processing services to client terminals by accessing the storage device 100 in response to requests from a plurality of client terminals arranged outside the drawing.

The management terminal 20 is a computer system for managing for example the condition of the storage device 100 and/or altering its configuration. The management terminal 20 is connected with an SVP 180, to be described, through a communication network CN2, acquires information indicating various conditions of the storage device 100 through the SVP 180 and gives various instructions to the storage device 100 through the SVP 180.

The first storage device 100 may comprise for example a plurality of channel adaptors (hereinbelow called "CHAs") 110, a plurality of disk adaptors (hereinbelow called "DKAs") 120, a cache memory 130, a shared memory 140, connection control units 150, 160, storage unit 170 and SVP 180, which will be respectively described below.

The CHA 110 controls data exchange between the host 1 constituting a host device and an external second storage device 200 and is constituted for example as a microcomputer system comprising for example a CPU and a memory and input/output circuitry. Each CHA 110 may comprise a respective plurality of communication ports; data exchange may be performed respectively individually with each communication port. The CHAs 110 respectively correspond to a single type of communication protocol and are provided in accordance with the type of host 10. That is, the CHAs 110 may be respectively constructed corresponding to a plurality of types of communication protocols.

The DKAs 120 control data exchange with the storage unit 170. Like the CHAs 110, the DKAs 120 may be constituted for example as a microcomputer system comprising a CPU and memory and other items. The DKAs 120 perform data reading or data writing by accessing disk drives 171 by for example converting logical block addresses (LBAs) designated from the host 10 to physical disk addresses. The functions of the CHAs 110 and DKAs 120 may be integrated in a single or a plurality of controllers.

The cache memory 130 stores write data that is written from the host 10 or read data that is read by the host 10. The cache memory 130 may comprise for example volatile or non-volatile memory. If the cache memory 130 comprises a volatile memory, memory back-up is preferably performed by means of for example a battery power source, not shown. Although not shown in the drawing, the cache memory 130 comprises two regions, namely, a read cache region and a write cache region; the data stored in the write cache region can be stored as multiple copies. That is, even if the read data is lost, since the same data is present on the disk drive 171, it suffices simply to re-read the disk drive 171; thus there is no need for storage as multiple copies. In contrast, the write data only exists in the cache memory 130 in the storage device 100 and it is therefore desirable from the point of view of reliability to store this write data as multiple copies. Of course, whether or not the cache data is to be stored in multiple copies depends on the specification.

The shared memory (or this may be called "control memory") 140 may comprise for example non-volatile memory or may comprise volatile memory. Control information or management information or the like, such as for example the mapping table T, is stored in the shared memory 140. These items of information such as control information may be managed in the form of multiple copies by a plurality of memories 140. An example of the construction of a mapping table T will be described later.

The shared memory 140 and cache memory 130 maybe constituted as respective separate memory packages or the cache memory 130 and shared memory 140 may be provided in the same memory package. Also, part of the memory may be employed as a cache region and another part may be employed as a control region. That is, the shared memory and cache memory may also be constituted as the same memory.

In the first connection control unit (switching unit) 150, the CHAs 110, DKAs 120, cache memory 130 and shared memory 140 are respectively mutually connected. In this way, all of the CHAs 110 and DKAs 120 may respectively individually access the cache memory 130 and shared memory 140. The connection control unit 150 may be constituted as for example a very high-speed cross bus switch. The second connection control unit 160 serves for respectively connecting the DKAs 120 and storage unit 170.

The storage unit 170 comprises a large number of disk drives 171. The storage unit 170 may be provided in the same cabinet together with the controller portion comprising for example the CHAs 110 and DKAs 120 or may be provided in another cabinet separate from the controller portion.

A plurality of disk drives 171 may be provided in the storage unit 170. As the disk drives 171, for example FC disks (Fiber Channel disks), SCSI (Small Computer Systems Interface) disks, or SATA (serial AT attachment) disks may be employed. Also, the storage unit 170 need not be constituted of the same type of disk drives but could also comprise a mixture of a plurality of types of disk drives.

Typically, performance deteriorates in the order: FC disks, SCSI disks, SATA disks. The various types of disk drives may therefore be separately employed depending on the mode of data used, by for example storing data that is frequently accessed (such as data of high information value) on high-performance FC disks, and storing data of low frequency of access (such as data of low information value) on low-performance SATA disks. A plurality of logical storage regions maybe provided in layered fashion on a physical storage region provided by the disk drives 171. The constitution of such a storage region will be described later with reference to FIG. 3.

The SVP (service processor) 180 is respectively connected with the CHAs 110 and DKAs 120 through an internal network CN3 such as a LAN. In the Figure, only the SVP 180 and CHAs 110 are connected, but it is also possible to connect the SVP 180 respectively with the DKAs 120. The SVP 180 collects the various conditions within the storage device 100 and presents these to the management terminal 20 indirectly or after processing.

The second storage device 200 is connected with the first storage device 100 through a communication network CN4 such as for example a SAN or the Internet. The second storage device 200 may comprise for example a controller 210, communication port 211 for connection with the first storage device 100 and disk drive 220. The controller 210 realizes the functions of the CHAs 110 and DKAs 120 described above and controls data exchange of the first storage device 100 and disk drive 220.

The second storage device 200 may have the same or substantially the same construction as the first storage device 100 or may have a different construction from the first storage device 100. The second storage device 200 can perform data communication in accordance with a prescribed communication protocol (such as for example FC or iSCSI) with the first storage device 100 and may comprise a storage drive (storage device) such as a disk drive 220. As will be described, the logical volume comprising the second storage device 200 is mapped onto a prescribed layer of the first storage device 100 and can be used as if it were an internal volume of the first storage device 100.

Although in this embodiment a hard disk was taken as an example of a physical storage drive, the present invention is not restricted to this and there are cases in which for example semiconductor memory drives, magnetic tape drives, optical disk drives, or magneto-optic disk drives may be employed as storage drives, apart from hard disks.

Figure 3:
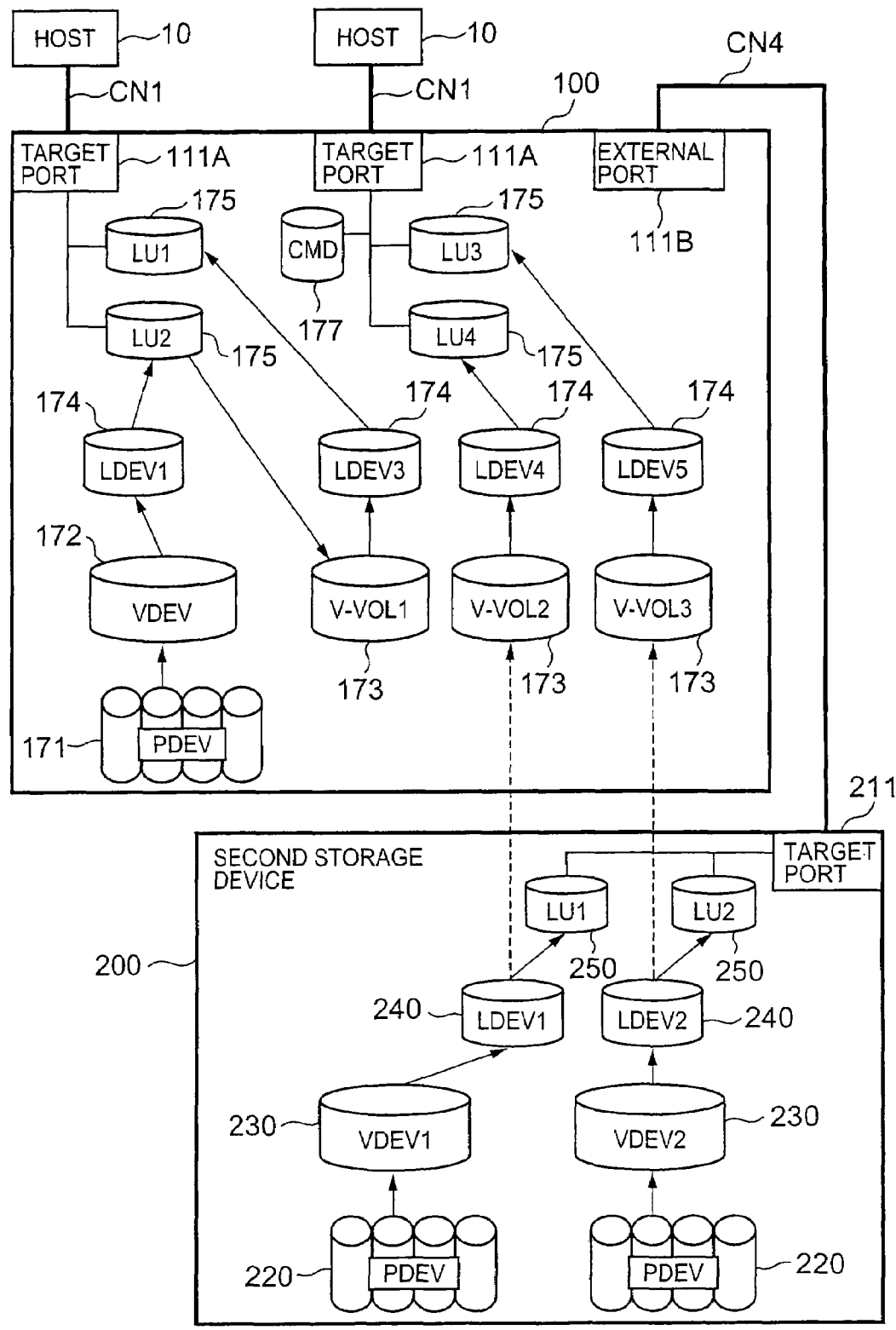
FIG. 3 is a diagram showing the storage layers of a storage system.

FIG. 3 is a layout diagram focusing on the logical storage structure of a storage system. First of all, the construction of a first storage device 100 will be described. The storage construction of the first storage device 100 may for example in the first instance be divided into a physical storage layer and logical storage layer. The physical storage layer comprises PDEVs (physical devices) 171, which are physical devices. The PDEVs correspond to disk drives.

A logical storage layer may comprise a plurality (for example two types of) layers. A single logical layer may comprise VDEVs (virtual devices) 172 and virtual VDEVs (hereinbelow also called "V-VOL") 173 which are treated as VDEVs 172. Another logical layer may comprise LDEVs (logical devices) 174.

The VDEVs 172 comprise for example a prescribed number of grouped PDEVs 171 such as for example a group of four (3D+1P) or a group of eight (7D+1P). The storage regions respectively provided by the PDEVs 171 belonging to a group are aggregated to form a single RAID storage region. This RAID storage region constitutes a VDEV 172.

In contrast to the VDEVs 172, which are constituted on a physical storage region, the V-VOLs 173 are virtual intermediate devices that do not require a physical storage region. A V-VOL 173 is not directly related to a physical storage region but constitutes a receptacle for mapping an LU (logical unit). This aspect will be further discussed later.

At least one or more LDEVs 174 may be provided on a VDEV 172 or V-VOL 173. LDEVs 174 may be constituted by dividing a VDEV 172 by a fixed length. When the host 10 is an open system host, the host 10 recognizes an LDEV 174 as a physical device by the LDEV 174 being mapped to an LU 175. The open system host 10 accesses a desired LDEV 174 by designating the LUN (logical unit number) or logical block address.

An LU 175 is a device that is recognizable as a SCSI logical unit. Each LUN 175 is connected with the host 10 through a port 111A. At least one or more LDEV 174 can be respectively associated with each LU 175. The LU size can be virtually expanded by associating a plurality of LDEVs 174 with a single LU 175.

The CMD (Command Device) 177 is a specialist LU that is employed for handing over command or status with a controller (CHA 110, DKA 120) of the storage device 100 and a control program running on the host 10. Commands from the host 10 are written to the CMD 177. The controller of the storage device 100 executes processing corresponding to the command written to the CMD 177 and writes the results of this execution as status to the CMD 177. The host 10 reads and confirms the status written in the CMD 177 and writes the processing content that is to be executed next, to the CMD 177. In this way, the host 10 can supply various types of instruction to the storage device 100 through the CMD 177.

It should be noted that commands received from the host 10 could also be processed without being stored on the CMD 177. Also, instead of defining an actual device (LU), the CMD could also be constituted so as to process commands from the host 10 on receipt, by generating this as a virtual device. That is, for example, a CHA 110 writes a command received from the host 10 into the shared memory 140, and this command stored in the shared memory 140 is processed by the CHA 110 or DKA 120. The result of this processing is written to the shared memory 140 and sent to the host 10 from the CHA 110.

The second storage device 200 is connected with an initiator port (external port) 111B for external connection of the first storage device 100 through a communication network CN4. The second storage device 200 comprises a plurality of PDEVs 220, VDEVs 230 that are set up on a storage region provided by a VDEV 220, and at least one or more LDEVs 240 that can be set up on the VDEV 230. Also, each LDEV 240 is associated with an LU 250.

In this embodiment, a logical device (LDEV) that actually stores data is not directly provided for the host 10 but is provided for the host 10 through a V-VOL 173 constituting a virtual intermediate device (virtual intermediate volume).

For example, although "LDEV 1", which is an internal volume of the first storage device 100, is associated with "LU 2", it is not directly provided to the host 10 from the "LU 2" but rather is mapped to the "V-VOL 1". This "V-VOL 1" is then mapped to "LDEV 3" and "LDEV 3" is associated with "LU 1". In this way, the internal volume "LDEV 1" of the first storage device 100 is mapped to "LDEV 3" via "V-VOL 1". The "LDEV 3" to which the LUN was allocated in association with "LU 1" corresponds to the access target device accessed from the host 10. In this embodiment, a double superimposed layer structure is adopted in which the "LDEV 1" constituting the data storage target device is further virtualized.

Likewise, the "LDEV 1" and "LDEV 2" of the second storage device 200 are respectively mapped to "V-VOL 1" and "V-VOL 2" of the first storage device 100 via the "LU 1" and "LU 2" of the second storage device 200. Also, "V-VOL 2" and "V-VOL 3" are respectively mapped to "LDEV 4" and "LDEV 5" and thus can be recognized from the host 10 via "LU 4" and "LU 3".

Figure 4:
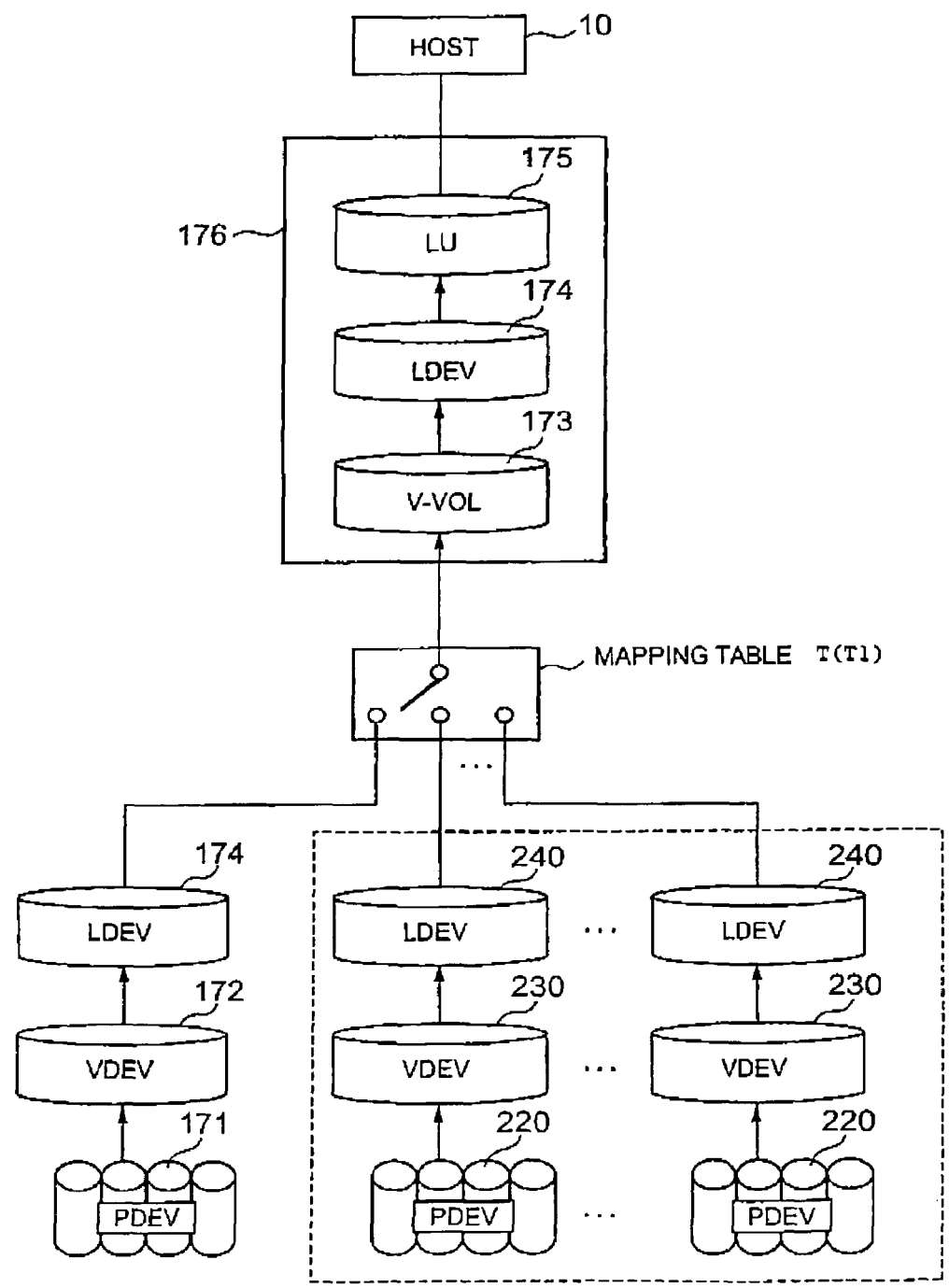
FIG. 4 is a diagram showing schematically the storage layers of a storage system.

FIG. 4 is a diagram showing schematically the storage layers in FIG. 3. The bottom part of FIG. 4 shows a plurality of devices for storing data. The PDEVs 171, PDEVs 172 and LDEVs 174 shown at the bottom left in FIG. 4 are data storage target devices provided by the first storage device 100. The PDEVs 220, VDEVs 230 and LDEVs 240 surrounded by the dotted line on the right-hand side of FIG. 4 are data storage target devices provided by the second storage device 200.

A virtual LU 176 is shown at the top in FIG. 4. This virtual LU 176 is constituted by stacking a V-VOL 173, LDEV 174 and LU 175 in order from the bottom layer. Although in FIG. 4 only a single virtual LU 176 is shown, this is merely for convenience in order to simplify the drawing and in fact a plurality of virtual LUs 176 can be provided. Although not shown in FIG. 4, the LDEVs 174 and 240 are connected with the virtual LU 176 via an LU that is respectively allocated thereto.

The virtual LU 176 and one or other LDEV of the data storage target LDEVs 174, 240 are logically connected by means of a mapping table. This mapping table constitutes at least part of the connection control unit. Connection or disconnection of the virtual LU 176 and LDEV 174, 240 can be performed by altering the entries in the mapping table.

As shown diagrammatically in FIG. 4, the LDEVs 174 and 240 for actually storing data are connected with the host 10 via the virtual LU 176. The host 10 recognizes the virtual LU 176 (more precisely, the LU 175 in the virtual LU 176) as an access target device. Consequently, even if the virtual LU 176 is not connected to any of the LDEVs 174, 240, the virtual LU 176 can still be recognized from the host 10.

However, even if recognition from the host 10 is lost, reading and writing of data from the host 10 cannot be performed unless one or other of the LDEVs 174, 240 is connected with the virtual LU 176.

Examples of the layout of the various tables T1, T2, respectively are described with reference to FIG. 5. These tables T1, T2 can be stored in the shared memory 140. First of all, FIG. 5(*a*) shows a mapping table T1 that associates the LUNs and V-VOLs. The V-VOL 173 is defined as a virtual VDEV that does not depend on a physical storage region and is handled as being a type of VDEV 172. Consequently, in FIG. 5(*a*) it is not marked as a "V-VOL" but rather shown as a "VDEV".

The mapping table T1 may be constructed by establishing a correspondence relationship between for example the VDEV number (VDEV #) for specifying the VDEV (V-VOL), the device identification information, the storage capacity, the type of device, and the path information of the connection point. The device identification information may include for example the initiator port number used for exchange of data with the connected device. Under "type of device" there may be stored the type of device such as whether the connected device is a disk device or is a tape device. The "connection point path information" may include for example the WWN (world wide name) and LUN. If information specifying the LU 250 provided on the second storage device 200 is set as the connection point path information of a particular VDEV (V-VOL), this VDEV (V-VOL) is connected with the LU 250 of the second storage device 200 i.e. with the LDEV 240 provided by the second storage device 200. If information specifying the LU 175 of the first storage device 100 is set as the connection point path information of another VDEV (V-VOL), this VDEV is connected with the LDEV 174 provided by the first storage device 100. In this way, both internal devices (LDEVs 174) and external devices (LDEVs 240) can be managed by a single mapping table T1. It should be noted that the mapping table T1 is not restricted to the above items and there could be added thereto other items such as for example the RAID level, stripe size, and storage device number.

FIG. 5(*b*) shows a LUN-LDEV-VDEV conversion table T2 for defining a virtual LU 176. This conversion table T2 may be constituted by setting up a correspondence relationship between for example the LUN, LDEV number, maximum slot number (capacity) of the LDEV, number of the VDEV (V-VOL), and maximum slot number (capacity) of the VDEV (V-VOL).

In the case of write access or read access from the host 10, the LUN and LBA (logical block address) for specifying the virtual LU 176 are specified. This combination of LUN+LBA is converted to a combination of a VDEV number (V-VOL number), slot number and sub-block address by referencing the conversion table T2. The combination of this VDEV number+slot number+sub-block address is converted to a combination of WWN+LUN+LBA by referencing the mapping table T1.

Figure 6:
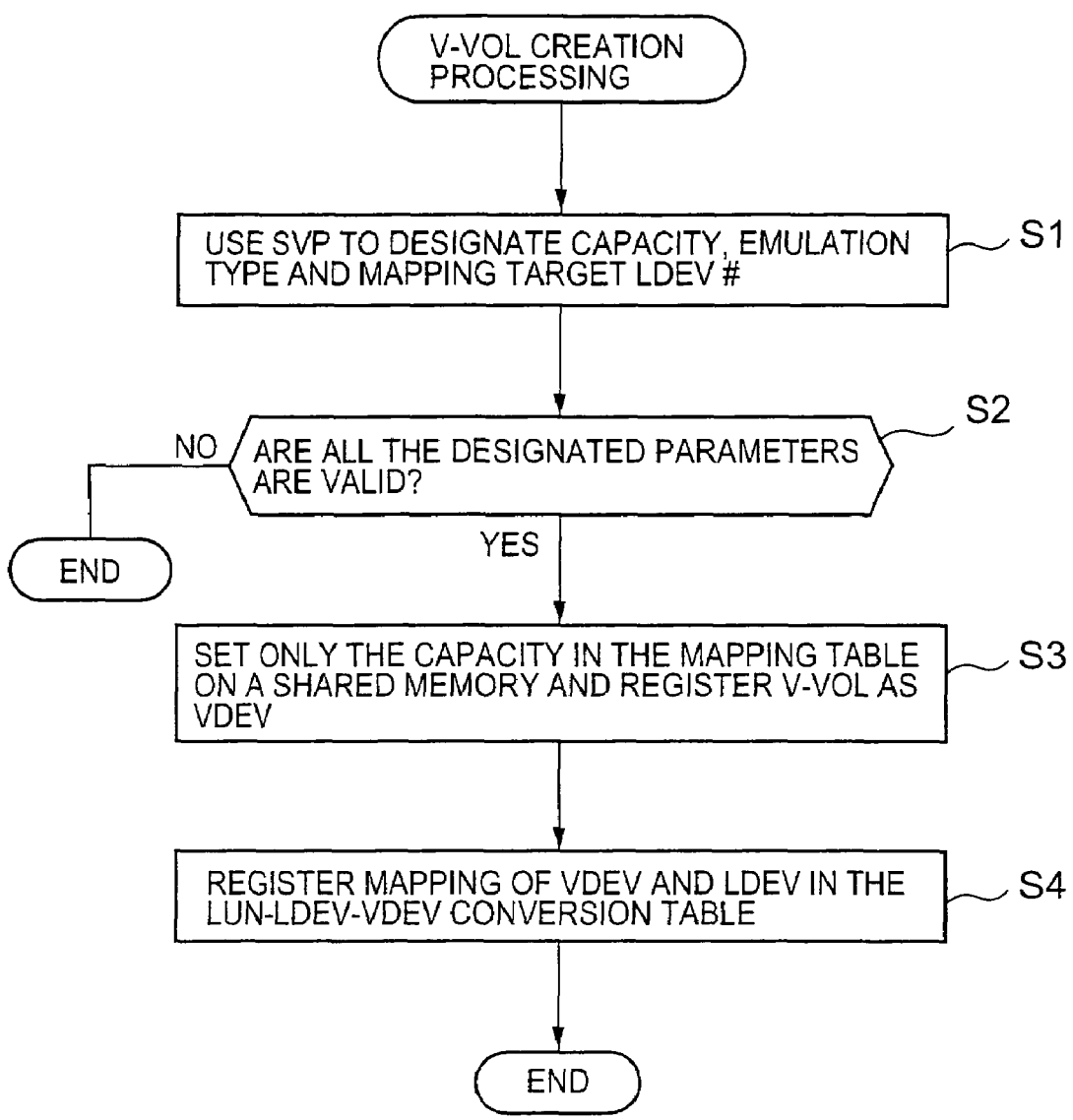
FIG. 6 is a flow chart showing V-VOL creation processing.

FIG. 6 is a flow chart showing an outline of processing for creating a V-VOL. The system manager gives instructions (S1) to create in the first storage device 100 a V-VOL of specified capacity, emulation type and mapping target LDEV number via SVP 180 from the management terminal 20. This creation instruction may be of a form supplied from the host 10.

The first storage device 100, after having received these creation instructions, determines whether or not all of the specified parameters are valid (S2). If there is a mistake in any one of the various necessary parameters for V-VOL creation, this generates an error and processing is terminated. Such error processing may comprise displaying the parameter in respect of which the error occurred on the screen of the management terminal 20 and prompting for this parameter to be re-specified.

If all the specified parameters are valid (S2: YES), in the first storage device 100, only the capacity of the V-VOL is set in the mapping table T1 stored in the shared memory 140 and the V-VOL is registered as a VDEV (S3). No values are set in respect of other items such as for example the device identification information or path information and these are left blank. In this way, a V-VOL 173 in respect of which only the storage capacity is defined is created.

Next, the first storage device 100 registers (S4) in the conversion table T2 the V-VOL number that was created in S3 and the LDEV number associated with this V-VOL. In this way, the V-VOL is associated with an LU via an LDEV and a virtual LU 176 is generated.

Figure 7:
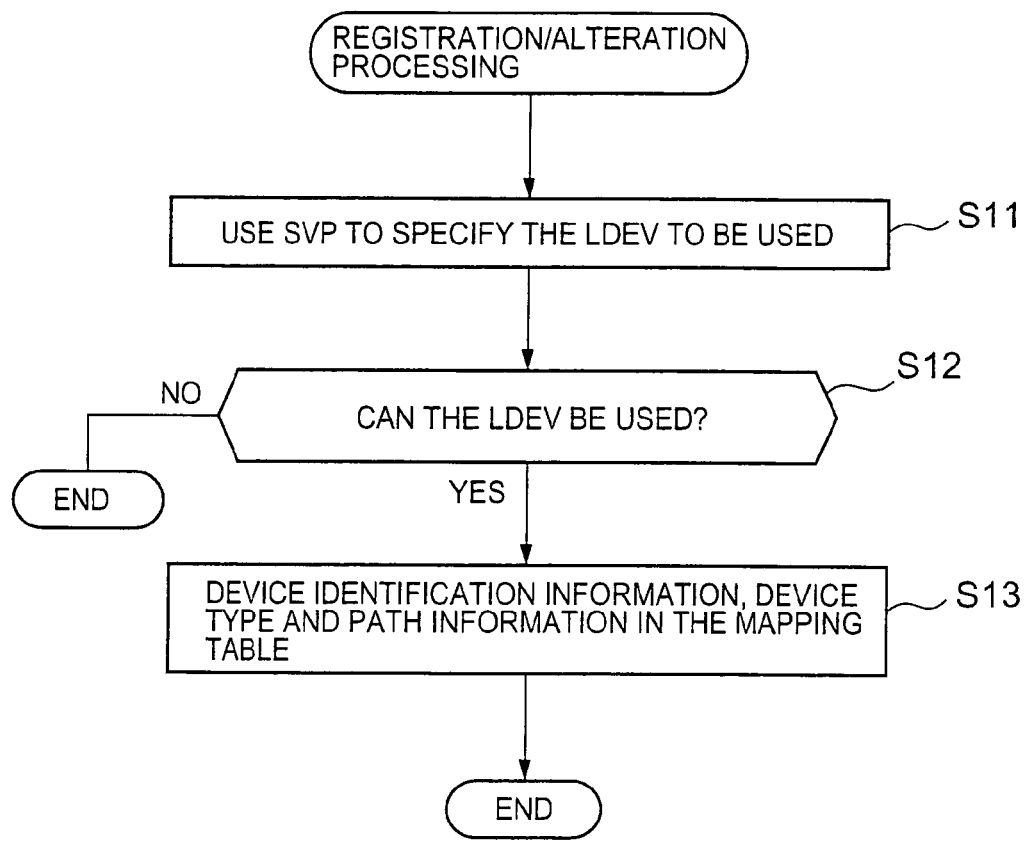
FIG. 7 is a flow chart showing registration/alteration processing of an LDEV mapped to a V-VOL.

FIG. 7 is a flow chart showing an outline of the processing for registering or altering the LDEV connected with the virtual LU 176. The system manager for example logs into the SVP 180 via the management terminal 20 and designates (S11) an LDEV for connection with the virtual LU 176. The storage device 100 determines whether or not the designated LDEV is usable (S12). If for example the designated LDEV is already used by another host 10 or if access protection (such as "read-only") has been set, the first storage device 100 is not allowed to use the designated LDEV.

If the designated LDEV is usable (S12: YES), the first storage device 100 sets (S13) the device identification information or device type and path information in the mapping table T1 such that this designated LDEV is connected with the V-VOL of the virtual LU 176. Specifically, in the processing described with reference to FIG. 6, values are set for the items that had been left unset. In this way, the LDEV where the data is actually stored is associated with the V-VOL.

Figure 8:
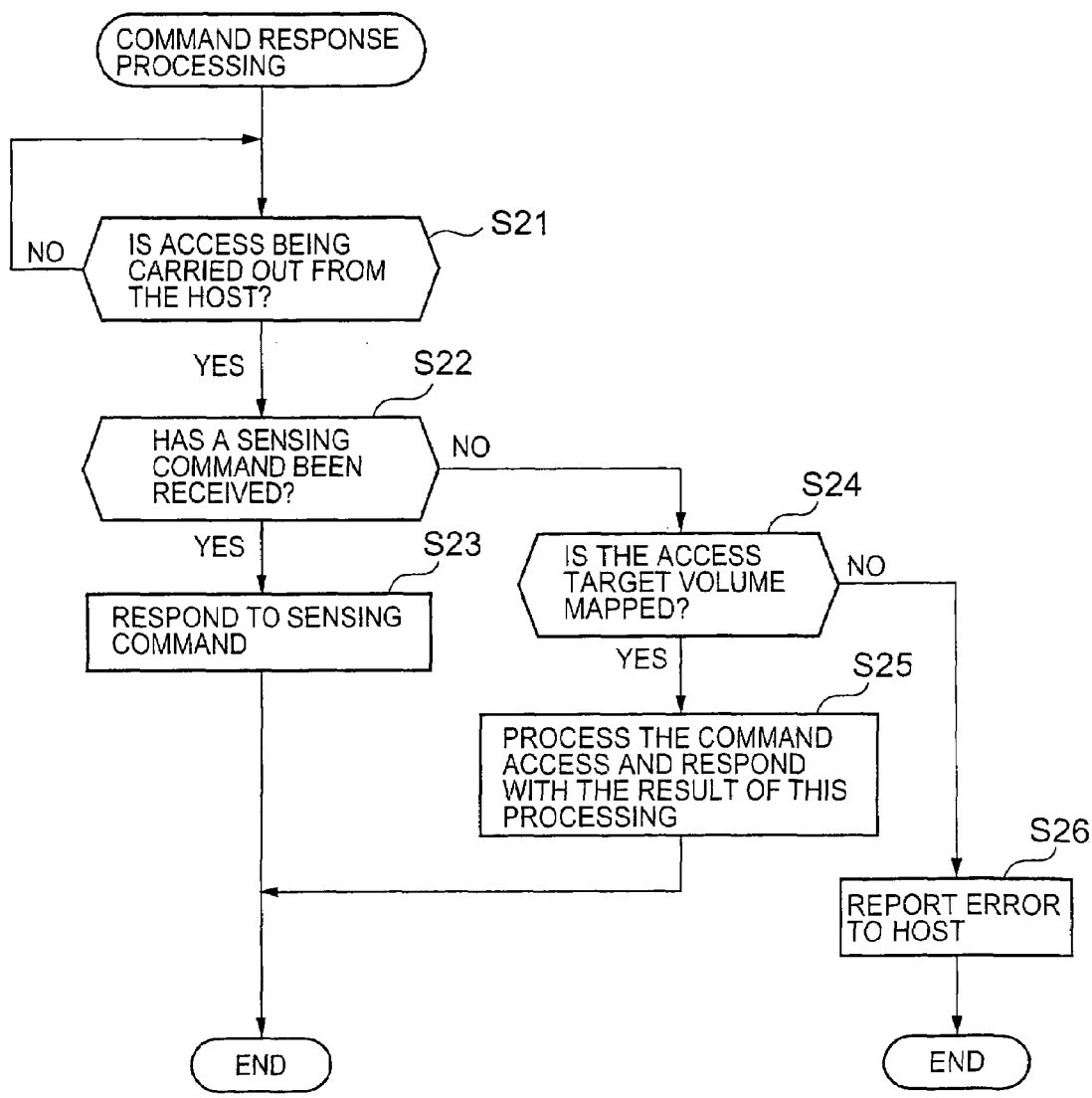
FIG. 8 is a flow chart showing command response processing.

FIG. 8 is a flow chart showing an outline of response processing to command access in respect of a virtual LU 176. If a host 10 having an access right accesses (S21: YES) the virtual LU 176, the first storage device 100 determines the type of this access.

Specifically, the first storage device 100 for example determines (S22) whether or not a sensing command has been received from the host 10. A sensing command is a command for ascertaining for example the condition of a device recognized by the host 10, such as for example an inquiry command. When a sensing command is received from the host 10, the first storage device 100 returns a response (S23) in respect of this sensing command. As described above, the virtual LU 176, unlike the conventional simple LU, comprises an LDEV 174 as shown in FIG. 4. Consequently, it can respond to an inquiry as to whether or not an LDEV exists as an access target device.

In contrast, if a command other than a sensing command is received from the host 10 (S22: NO), the first storage device 100 determines (S24) whether or not the LDEV constituting the data storage target device has already been mapped onto the virtual LU 176. Examples of commands other than sensing commands include read commands or write commands.

If an LDEV for reading and writing of data is in fact connected (S24: YES) with the virtual LU 176, the first storage device 100 processes the command access from the host 10 and returns the result of this processing to the host 10 (S25).

For example in the case of a write command, at the timepoint where the write data received from the host 10 is stored in the cache memory 130, the CHA 110 of the first storage device 100 reports completion of writing to the host 10. The DKA 120 of the first storage device 100 waits for an opportunity and writes the data stored on the cache memory 130 to a prescribed disk drive 171. In the case of a read command, the DKA 120 reads the requested data from the prescribed disk drive 171 and stores it in the cache memory 130. The CHA 110 sends the data stored in the cache memory 130 to the host 10. If the data requested by the host 10 has already been stored in the cache memory 130, this data is provided to the host 10. The CHA 110 and the DKA 120 ascertain the state of processing of the command via the shared memory 140.

If a command other than a sensing command has been received by the host 10 and if the LDEV for actually writing the data is not mapped on the virtual LU 176 (S24: NO), the first storage device 100 reports an error to the host 10 (S26).

Figure 9B:
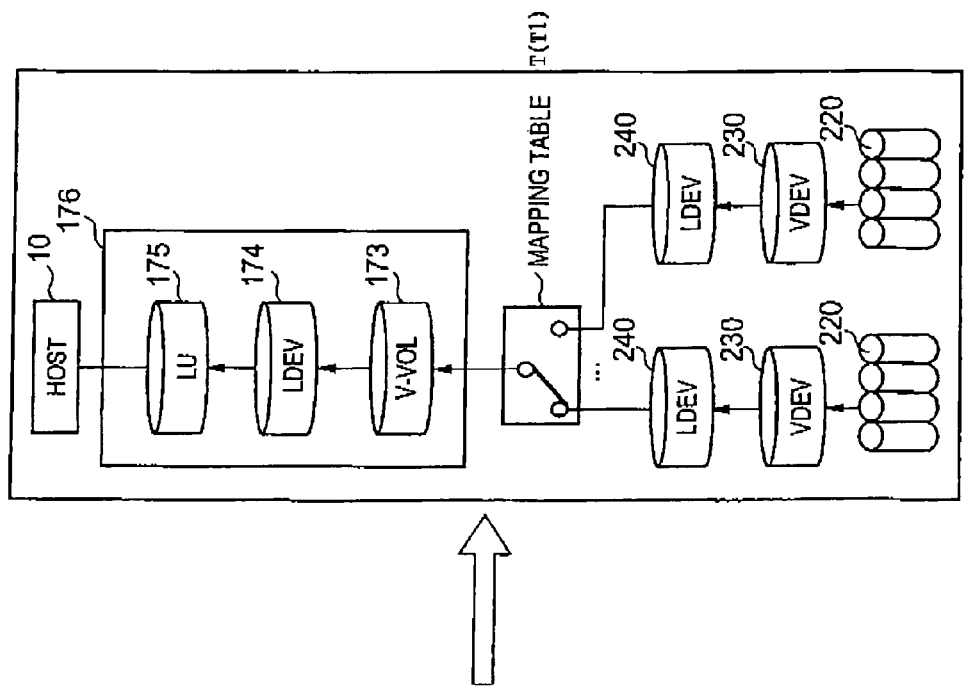
FIG. 9(a) shows the condition when a virtual LU is generated and FIG. 9(b) shows the condition when a single volume is connected with the virtual LU, respectively.
Figure 9A:
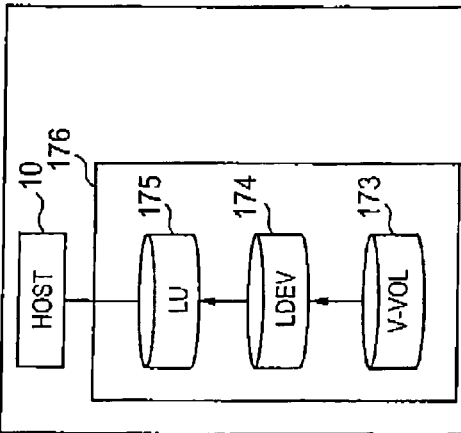

With this embodiment, thanks to the construction described above, the following effects are presented. In this embodiment, since the LDEV in the first storage device 100 or the LDEV in the second storage device 200 is mapped onto the LDEV 174 via the V-VOL 173, its recognition as a device by the host 10 can be maintained. Consequently, as shown in FIG. 9(*a*), only the virtual LU 176 is set and, even in a condition in which the LDEV that is employed for actual reading and writing of data is not mapped, recognition from the host 10 is not lost and sensing commands from the host 10 can be responded to.

That is, a virtual LU 176 is constituted that is capable of being recognized permanently from the host 10 and a construction is produced in which the LDEV is connected with this virtual LU 176 via the mapping table. Consequently, as shown in FIG. 9(*b*), LDEVs that are positioned inside or outside the first storage device 100 can be connected at will with the virtual LU 176. Consequently, LDEVs present inside or outside the storage device can be changed over in use in accordance with for example utilization of data and the operation of changeover of such LDEVs can be performed transparently with respect to the host 10.

Thus the virtual LU 176 permanently retains recognition from the host 10 and is capable of responding to sensing commands so, as shown in FIG. 10(*a*), recognition from the host 10 is not lost even if the connected LDEV is changed over during the course of processing. Consequently, even if there is momentary disconnection of the connection between the virtual LU 176 and the LDEV, the action of fault monitoring software mounted on the host 10 in detecting this disconnected condition can be forestalled, so interruption of information processing services can be prevented.

For example if Windows (registered trademark) is installed on the host 10, Windows periodically checks to ascertain whether or not a drive (LDEV) is connected and if a disconnected condition of the drive is recognized, operation of the application program is interrupted.

In contrast, in the case of installation of an OS other than Windows (registered trademark) on the host 10, unless fault monitoring software is installed, inquiry commands cannot be transmitted to the first storage device 100, so there is a possibility that it may not be possible to ascertain the connected condition of the drive. If fault monitoring software is not installed, there is a risk of adverse effect on safety or reliability, but, if no fault monitoring software is installed, a fault may be registered every time the LDEV is changed over, giving rise to a possibility of interruption of processing by the application software.

However, in this embodiment, the connection with the host 10 is permanently maintained and the mount point is fixed, so the LDEV can be freely changed over transparently with respect to the host 10 and, as shown in FIG. 10(*b*), monitoring by the fault monitoring software is evaded and changeover of an LDEV connected with the virtual LU 176 can be performed.

Also, in this embodiment, thanks to a construction whereby the LDEV changeover processing within the first storage device 100 is hidden from the host 10, freedom of use can be improved by a comparatively straightforward construction. For example, although a construction might be considered in which, if the LDEV connected with the virtual LU 176 was to be changed over, this changeover would be reported to the host 10 beforehand for detection by the fault monitoring software to be disabled, this would necessitate alteration of the construction of all of the hosts 10 currently connected with the first storage device 100 and all the hosts 10 that might be connected therewith in future. Ease of operation would therefore be adversely affected and maintenance costs of the storage system increased.

It should be noted that FIG. 9(*a*) shows a condition in which the virtual LU 176 is set up by creating a V-VOL 173; in this condition, the LDEV that is used for actual reading and writing of data is not connected therewith. FIG. 9(*b*) shows a condition in which, towards the middle of the drawing, the left-hand side LDEV and the virtual LU 176 are connected by means of the setting of the mapping table T1. For example, in this condition, the host 10 performs reading and writing of data with respect to the left-hand side LDEV 240.

If the application program 13 that is installed on the host 10 requests changeover of the volume that is the subject of access, as shown in FIG. 10(*a*), the first storage device 100 first deletes the connection between the virtual LU 176 and the LDEV 240 by deleting the setting of the mapping table T1. The first storage device 100 then reconnects the virtual LU 176 with the LDEV 240 on the right-hand side in the Figure, by rewriting the mapping table T1. However, such changeover of LDEV cannot be recognized from the host 10. The host 10 permanently recognizes, in fixed fashion, only the LDEV 174 of the virtual LU 176.

2. Second Embodiment

A second embodiment of the present invention is described with reference to FIG. 11 and FIG. 12. Further embodiments including the present embodiment correspond to modifications of the first embodiment. The characteristic feature of the present embodiment lies in changeover of connection between the V-VOL 173 and the LDEV 174.

Figure 11:
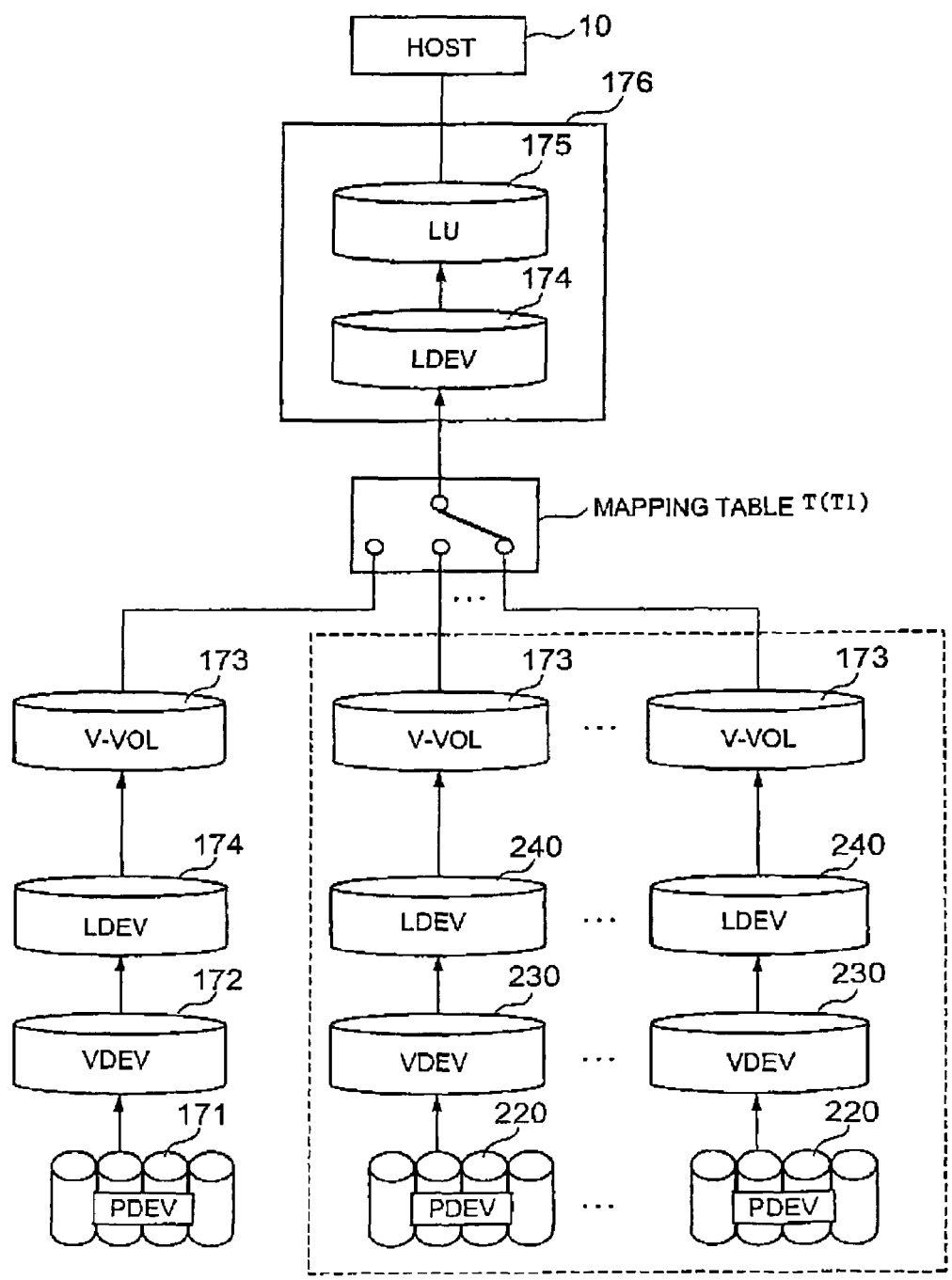
FIG. 11 is a diagram showing schematically storage layers of a storage system according to a second embodiment of the present invention.
Figure 12:
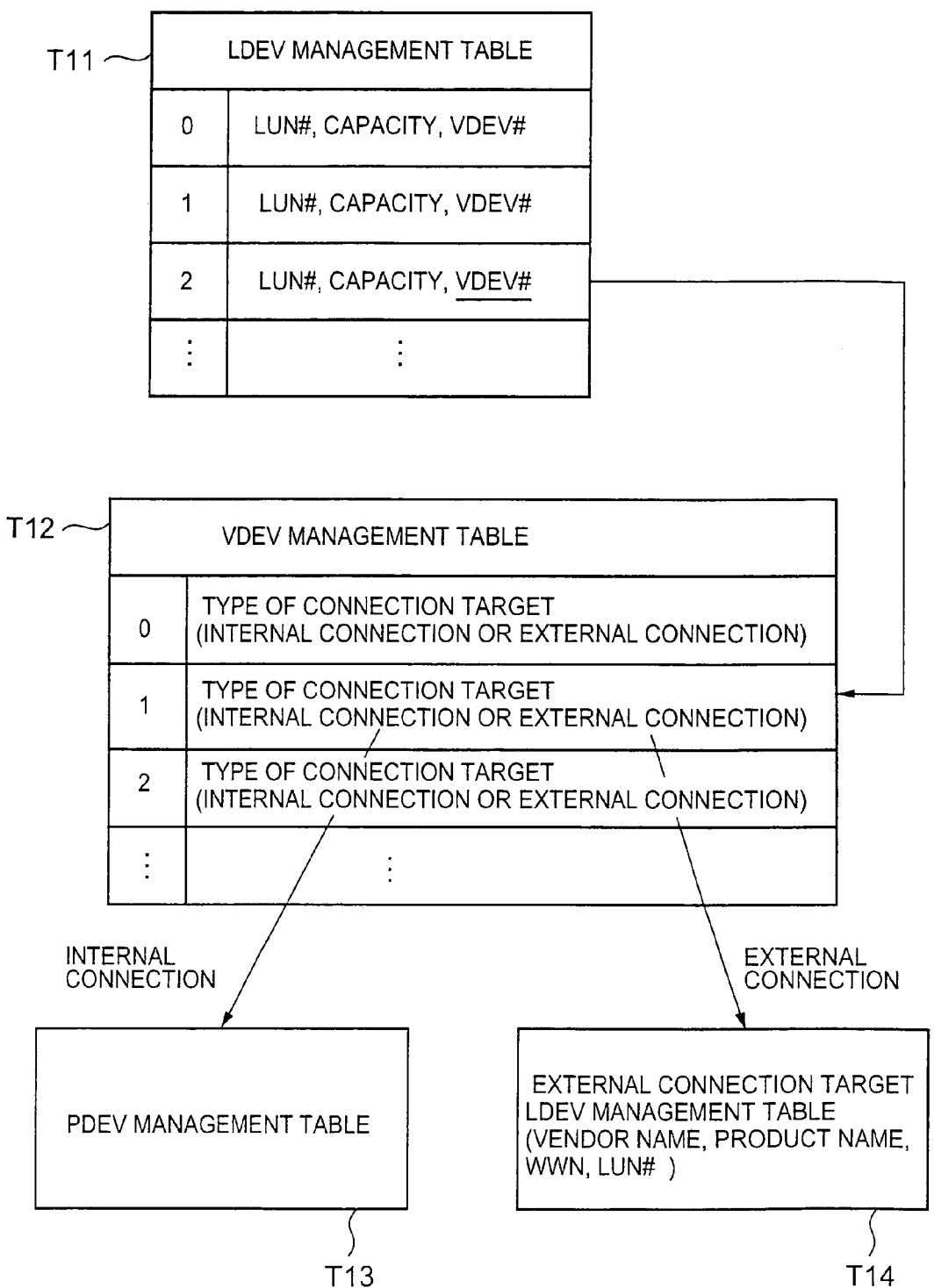
FIG. 12 is a diagram showing an example of the construction of a group of tables used for changeover of a volume connected with a virtual LU and the relationship between the various tables.

FIG. 11 is a diagram showing schematically the construction of the storage layers in this embodiment. In this embodiment, the virtual LU 176 comprises an LU 175 and LDEV 174. The virtual LU 176 can therefore be connected with any one V-VOL 173 through the mapping table T1. Specifically, in this embodiment, the V-VOL 173 is fixedly connected with the data storage target LDEV side and it is arranged to change over connection between this V-VOL 173 and the virtual LU 176.

Such a connection changeover can be achieved by applying the construction of the mapping table T1 as described above. Also, as another example, as shown in FIG. 12, it can be achieved using the LDEV management table T11 and VDEV management table T12.

The LDEV management table T11 can be constructed by establishing a correspondence relationship of for example the LDEV number, the LUN that is allocated to this LDEV, the storage capacity and the number of the VDEV (V-VOL) that is connected with this LDEV.

The VDEV management table T12 is a table for managing the VDEVs and V-VOLs and is constructed by for example establishing a correspondence relationship between the VDEV number (V-VOL number), and the type of device connected with this VDEV (V-VOL). Examples of the type of connection target are an internal connection or external connection. An internal connection means connection of this V-VOL with an LDEV in the first storage device 100. An external connection means connection of the V-VOL with an LDEV present outside the first storage device 100 i.e. an LDEV in the second storage device 200.

In the case of an internal connection, the PDEVs management table T13 is referred to. The PDEVs management table T13 is a table for managing the PDEVs 171 within the first storage device 100. In contrast, in the case of an external connection, the external connection target LDEV management table T14 is referred to. The external connection target LDEV management table T14 is a table for managing LDEVs within the second storage device 200 that are directly connected with the first storage device 100. This table T14 may include for example the vendor name, product name, WWN, LUN and initiator port number employed.

By such a construction of the tables T11 to T14, a V-VOL connected with an LDEV constituting a data storage target device and a virtual LU 176 may be connected in a manner where by connection can be changed over.

The same effects as in the case of the first embodiment are achieved with this embodiment, by the construction described above. In addition, in this embodiment, since the V-VOL 173 and the LDEV 240 (or the data storage target device LDEV 173) are arranged in a correspondence relationship beforehand, the data storage target device can be freely changed over simply by setting up a correspondence relationship of the V-VOL 173 and virtual LU 176.

3. Third Embodiment

Figure 13:
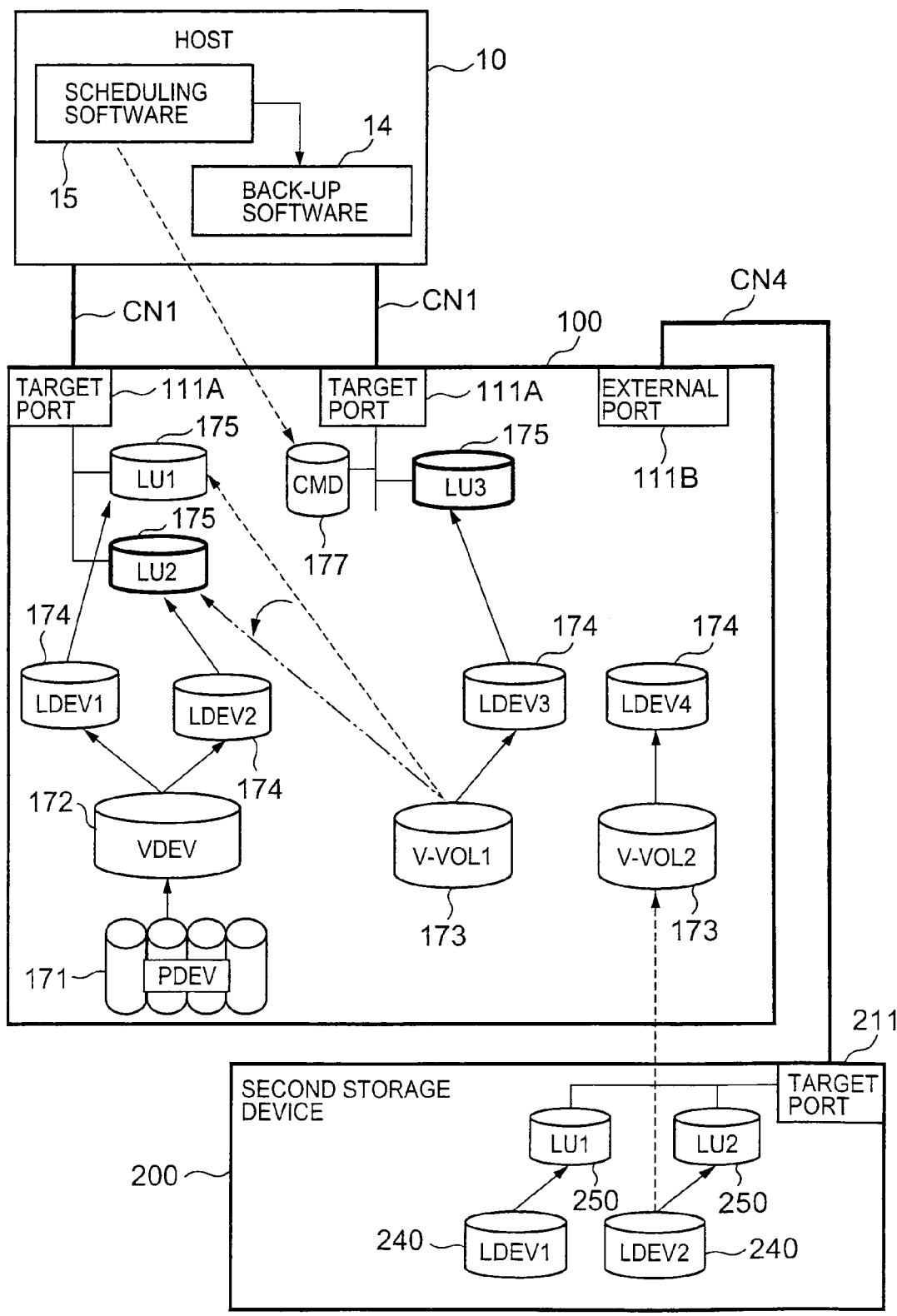
FIG. 13 is a diagram showing schematically the construction of a storage system according to a third embodiment of the present invention.

A third embodiment of the present invention is described with reference to FIG. 13 and FIG. 14. The characteristic feature of this embodiment is the use of back-up processing. Back-up software 14 and scheduling software 15 are installed on the host 10.

The back-up software 14 executes processing whereby the storage content of a volume (LDEV) designated as a back-up source is backed up by copying to a designated volume (LDEV) constituting a back-up target.

The scheduling software 15 controls for example the time of back-up; when the prescribed time has arrived, it prepares a back-up target volume and gives instructions for execution of back-up to the back-up software 14.

In this case, for example the "LDEV 2" of the second storage device 200 is designated as a back-up source volume. The back-up target LU is designated as the "LU 3" of the first storage device 100.

At a certain time point, the back-up target "LU3" is connected with the "LU 1" of the first storage device 100 via the "LDEV 3" and "V-VOL 1" of the first storage device 100 and is connected with the "LDEV 1" through this "LU 1". That is, the back-up target volume that stores the back-up data is the "LDEV 1" of the first storage device 100. The back-up software 14 reads the data of the back-up source volume "LDEV 2" that is located in the first storage device 200 and writes the data which is thus read to the "LU 3" of the first storage device 100. The data that is written to the "LU 3" is stored in the "LDEV 1" of the first storage device 100.

When, after the lapse of a prescribed time, the back-up time again arrives, the scheduling software 15 gives instructions through the CMD 177 to the first storage device 100 for changeover of the back-up target volume. On receipt of these instructions, the first storage device 100 changes over the LU that is mapped to "V-VOL 1" from "LU 1" to "LU 2". In this way, the back-up target volume is changed from "LDEV 1" to "LDEV 2" of the first storage device 100.

Figure 14:
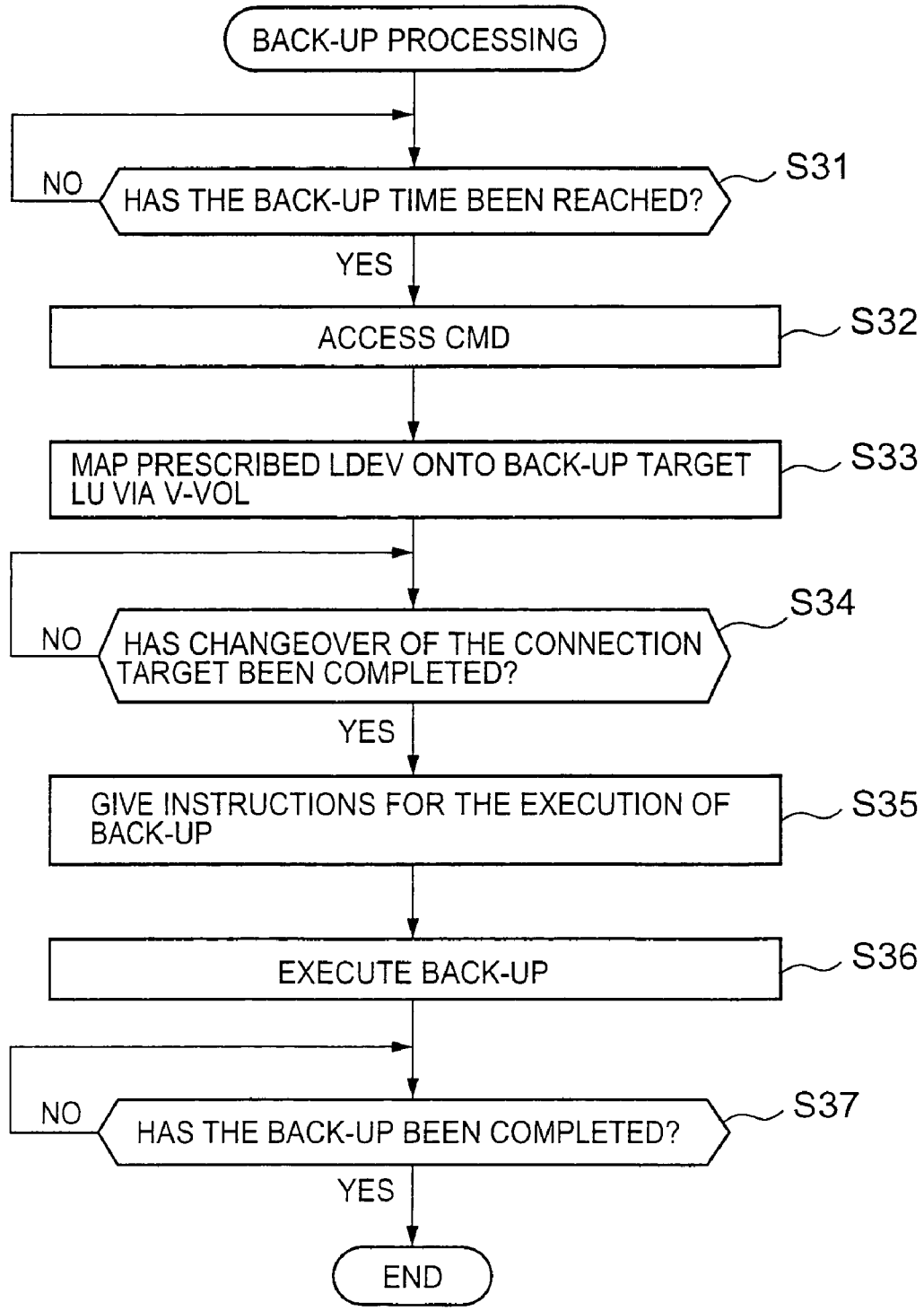
FIG. 14 is a flow chart showing back-up processing.

FIG. 14 shows an outline of the processing described above. FIG. 14 is a flow chart of the back-up processing.

The scheduling software 15 determines (S31) whether or not the back-up time has arrived by for example monitoring an internal timer. The back-up processing can be performed by selecting for example a time outside business hours, in which there is comparatively little load on the storage system.

When the scheduling software 15 detects that the back-up time has arrived (S31: YES), it accesses the CMD 177 of the first storage device 100 and gives instructions (S32) for changeover of the back-up target volume.

On receipt of these changeover instructions, the first storage device 100 establishes a correspondence relationship (S33) of the prescribed LDEV with the "V-VOL 1" which is a virtual intermediate device for back-up purposes. As the prescribed LDEV, for example an LDEV having a free capacity matching the back-up data and in respect of which access restrictions such as read-only are not set is selected.

When changeover of the back-up target volume has been completed, the first storage device 100 writes status information indicating that processing has been completed to the CMD 177. When the scheduling software 15 ascertains that the "changeover completed" status has been written to the CMD 177 (S34: YES), the scheduling software 15 gives instructions for execution of back-up processing (S35) to the back-up software 14.

When the back-up software 14 receives instructions from the scheduling software 15, it commences back-up processing (S36) and writes the data read from the back-up source volume to the back-up target volume. When all the data to be backed up has been copied (S37: YES), back-up processing is terminated.

In this way, the back-up software 14 can be used with the back-up target volume being freely changed over, yet while always employing the "LU 3" of the first storage device 100 in fixed fashion as the LU for back-up purposes. That is, freedom of use of the back-up software 14 is improved since there is no need to change over the connection target LU every time the back-up volume is altered, as is the case conventionally.

4. Fourth Embodiment

Figure 15:
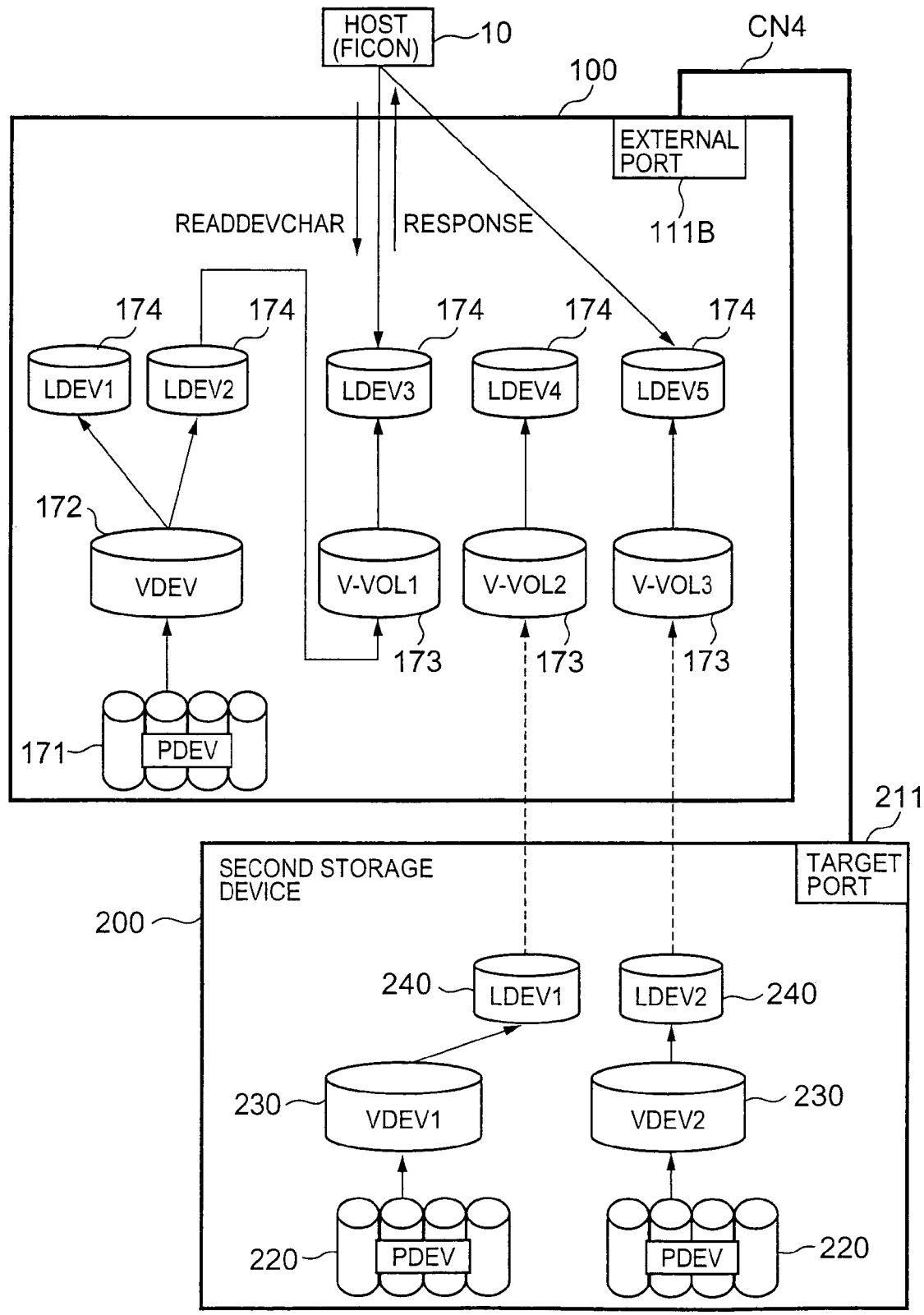
FIG. 15 relates to a fourth embodiment of the present invention and is a diagram of a storage system in the case where this fourth embodiment is applied to a mainframe host.

FIG. 15 shows a fourth embodiment of the present invention. The characteristic feature of this embodiment is that a so-called mainframe host is employed as the host 10. A mainframe host 10, unlike an open system host, can directly recognize an LDEV without the intervention of an LU.

Also, in the case of a mainframe host 10, a READDEV-CHAR command is employed instead of an inquiry command. Also in the case of a storage system comprising a mainframe host, just as in the case of the first embodiment, an LDEV constituting a data storage target device can be freely changed over transparently with respect to the host 10.

5. Fifth Embodiment

Embodiment 5

Figure 16:
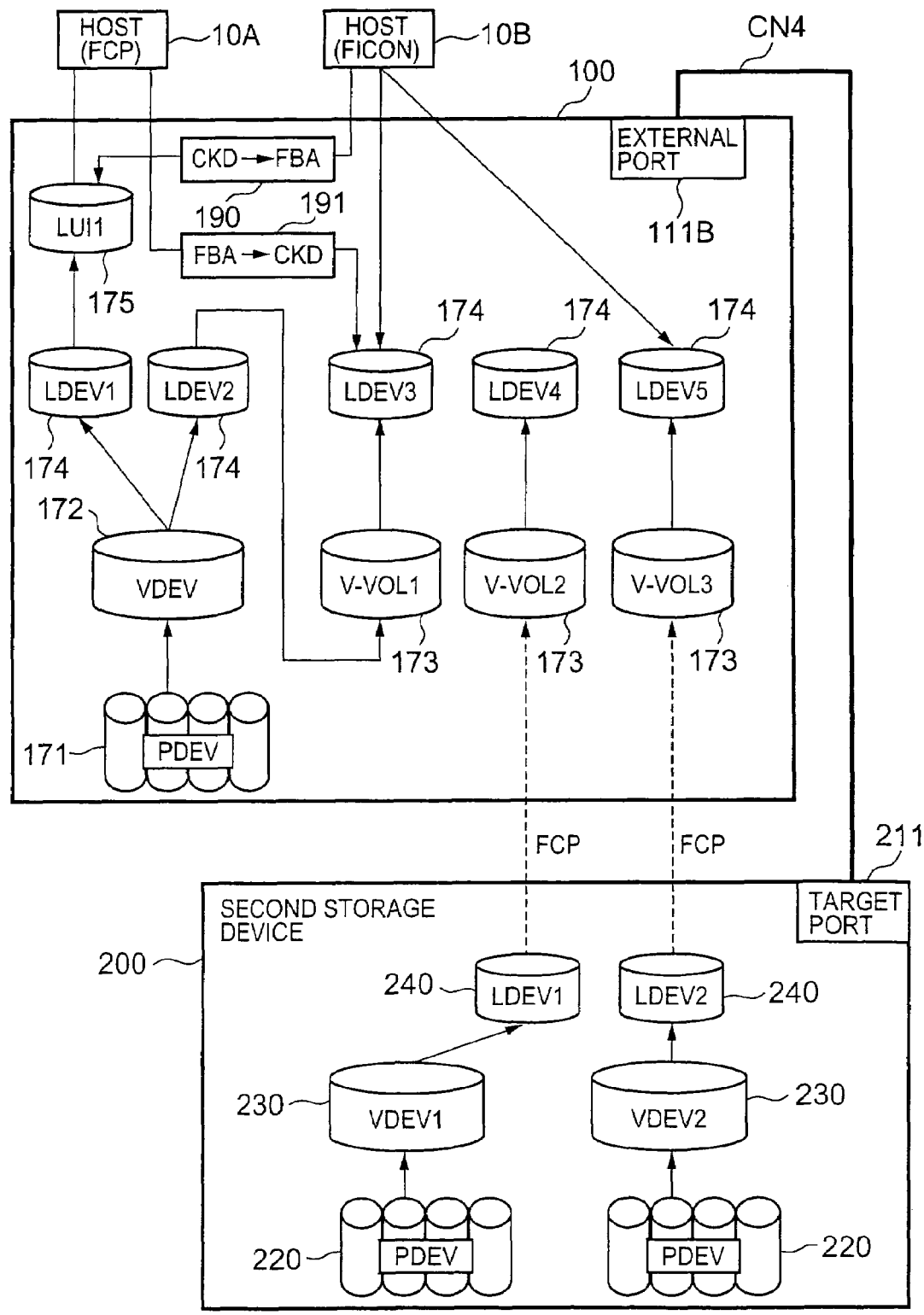
FIG. 16 is a diagram of a storage system according to a fifth embodiment of the present invention.

FIG. 16 shows a fifth embodiment of the present invention. The characteristic feature of this embodiment is that it is employed in an environment in which both an open system host 10A and a mainframe host 10B are present. The open system host 10A accesses the first storage device 100 using a communication protocol such as for example FCP, iSCSI or TCP/IP. The subject of recognition by the open system host 10A is an LU. The mainframe host 10B accesses the first storage device 100 using a specialist protocol such as FICON or ESCON, as already described. The mainframe host 10B directly recognizes the LDEV 174.

Also, the open system host 10A performs input/output of data in accordance with for example a format called FBA (Fixed Block Architecture). The mainframe host 10B performs input/output of data for example in accordance with a format called CKD (Count-Key-Data disk architecture).

The first storage device 100 is provided with format conversion units 190, 191 for format conversion between FBA and CKD. For example, one format conversion unit 190 converts CKD to FBA and the other format conversion unit 191 converts FBA to CKD. For explanation purposes, two types of format conversion units 190, 191 are shown in the drawing.

The mainframe host 10B can access the LDEV 174 for the mainframe host 10B (mainframe volume) using the CKD format. Also, the mainframe host 10B can access the LDEV 174 (open system volume) for the open system host 10A via the format conversion unit 190. Likewise, the open system host 10A accesses the open system volume using the FBA format and can access the mainframe volume via the format conversion unit 191. In this way, the open system host 10A and the mainframe system host 10B can perform data reading and writing by accessing a volume in accordance with the format which they themselves employ and, in addition, can perform data reading and writing by accessing volumes in accordance with other formats.

Also, even in the case of a mainframe volume, if this is connected to an external storage device, it can access the external storage device after conversion to open system FCP commands.

It should be noted that the present invention is not restricted to the embodiments described above. Various additions or modifications may be carried out within the scope of the present invention by persons skilled in the art. For example, there is no restriction to the storage systems being constituted of two storage devices, namely, a first storage device and a second storage device and the storage systems could be constituted by connecting more storage devices.

Also, the instruction to change over the LDEV allocated to the V-VOL could be given via a CMD (in-band system) or could be given from the management terminal without passing through a CMD (out-band system).

What is claimed is:

1. A virtualization device in connection with a storage system, comprising:
    at least one or more access target virtual volumes that are recognized as access targets for input/output of data from a host device;
    data storage target logical volumes that store data in respect of said at least one or more access target virtual volumes, and that are dynamically connectable and disconnectable via a mapping table, with said at least one or more access target virtual volumes; and
    a connection control unit that controls dynamic connection and disconnection mapping of said at least one or more access target virtual volumes with said data storage target logical volumes via entries within the mapping table, to afford connection to differing said data storage target logical volumes using a common access target virtual volume of said at least one or more access target virtual volumes;
    wherein to effect the dynamic connection and disconnection mapping, said at least one or more access target virtual volumes may each be switched between: a mapped state in which connection mapping correspondence is established with the data storage target logical volumes; and, a not-mapped state in which connection mapping correspondence is not established with the data storage target logical volumes, and wherein said switched operation effects switching between the mapped state and the non-mapped state without movement and relocation of data;
    wherein said at least one or more access target virtual volumes are recognizable as a volume by the host computer in both said mapped state and said not-mapped state, and respond differently to commands received from the host computer in said mapped state and said not-mapped state, respectively; and,
    wherein the storage system includes a plurality of storage devices and a storing control device that controls reading and/or writing of data targeted with respect to at least one data storage target logical volume in which mapping correspondence is established.

2. The virtualization device according to claim 1, wherein said connection control unit links a prescribed data storage target logical volume with a specified said access target virtual volume in accordance with input changeover instructions.

3. The virtualization device according to claim 2, wherein said connection control unit controls said mapping in at least two conditions of a first condition wherein said access target virtual volume is connected to said prescribed data storage target logical volume, and a second condition wherein said access target virtual volume is not connected to any of said data storage target logical volumes.

4. The virtualization device according to claim 3, wherein said access target virtual volume is capable of responding to a prescribed command from said host device even when put in said second condition by said connection control unit.

5. The virtualization device according to claim 4, wherein said prescribed command is a sensing command.

6. The virtualization device according to claim 1, comprising an external connection unit for performing data exchange with another virtualization device provided on the outside,
wherein at least a portion of the data storage target logical volumes is provided within said other virtualization device.

7. The virtualization device according to claim 1, wherein said data storage target logical volumes are arranged to be linked with said at least one or more access target virtual volumes via a virtual intermediate device; and
said connection control unit connects said at least one or more access target virtual volumes and said prescribed data storage target logical volume by linking said virtual intermediate device that is fixedly connected to said at least one or more access target virtual volumes with said prescribed data storage target logical volume.

8. The virtualization device according to claim 1, wherein said data storage target logical volumes are arranged to be linked with said at least one or more access target virtual volumes via a virtual intermediate device; and
said connection control unit connects said at least one or more access target virtual volumes and said prescribed data storage target logical volume by linking said virtual intermediate device that is fixedly connected to said data storage target logical volumes with said at least one or more access target virtual volumes.

9. The virtualization device according to claim 1, comprising a memory unit that stores a management information mapping structure for designating linking said at least one or more access target virtual volumes and a prescribed data storage target logical volume,
wherein said connection control unit effects connection by linking said at least one or more access target virtual volumes and said prescribed data storage target logical volume, by setting prescribed information in said management information mapping structure in accordance with input changeover instructions.

10. The virtualization device according to claim 1, wherein a general purpose operating system and general purpose communication protocol are installed on said host device, and said host device recognizes a logical unit (LU) as said at least one or more access target virtual volumes.

11. The virtualization device according to claim 1, wherein said host device is a mainframe machine, and said host device recognizes a logical device (LDEV) as said at least one or more access target virtual volumes.

12. The virtualization device according to claim 1, wherein said data storage target logical volume is set up on an intermediate device, and said intermediate device is set up on a storage region provided by a plurality of physical devices that store data respectively.

13. The virtualization device according to claim 1, wherein said access target virtual volume includes a logical unit (LU), a logical device (LDEV) and a virtual volume (V-VOL), stacked in an order as stated, with said LU being more closely coupled to said host than said V-VOL.

14. A system comprising:
at least one host device;
at least one storage system; and,
a virtualization device in connection with the storage system, including:
at least one or more access target virtual volumes that are recognized as access targets for input/output of data from a host device;
data storage target logical volumes that store data in respect of said at least one or more access target virtual volumes, and that are dynamically connectable and disconnectable via a mapping table with said at least one or more access target virtual volumes; and
a connection control unit that controls dynamic connection and disconnection mapping of said at least one or more access target virtual volumes with said data storage target logical volumes via entries within the mapping table, to afford connection to differing said data storage target logical volumes using a common access target virtual volume of said at least one or more access target virtual volumes;
wherein to effect the dynamic connection and disconnection mapping, said at least one or more access target virtual volumes may each be switched between: a mapped state in which connection mapping correspondence is established with the data storage target logical volumes; and, a not-mapped state in which connection mapping correspondence is not established with the data storage target logical volumes, and wherein said switched operation effects switching between the mapped state and the non-mapped state without movement and relocation of data;
wherein said at least one or more access target virtual volumes are recognizable as a volume by the host computer in both said mapped state and said not-mapped state, and respond differently to commands received from the host computer in said mapped state and said not-mapped state, respectively; and,
wherein the storage system includes a plurality of storage devices and a storing control device that controls reading and/or writing of data targeted with respect to at least one data storage target logical volume in which mapping correspondence is established.

15. The system according to claim 14, wherein said access target virtual volume induces a logical unit (LU), a logical device (LDEV) and a virtual volume (V-VOL), stacked in an order as stated, with said LU being more closely coupled to said host than said V-VOL.

16. A virtualization method operative in connection with a storage system, comprising:
recognizing at least one or more access target virtual volumes as access targets for input/output of data from a host device;
maintaining data in respect of said at least one or more access target virtual volumes, in data storage target logical volumes that are dynamically connectable and disconnectable via a mapping table, with said at least one or more access target virtual volumes; and
controlling dynamic connection and disconnection mapping of said at least one or more access target virtual volumes with said data storage target logical volumes via entries within the mapping table, to afford connection to differing said data storage target logical volumes using a common access target virtual volume of said at least one or more access target virtual volumes;

wherein to effect dynamic connection and disconnection mapping, said at least one or more access target virtual volumes may each be switched between: a mapped state in which connection mapping correspondence is established with the data storage target logical volumes; and, a not-mapped state in which connection mapping correspondence is not established with the data storage target logical volumes, and wherein said switched operation effects switching between the mapped state and the non-mapped state without movement and relocation of data;

wherein said at least one or more access target virtual volumes are recognizable as a volume by the host computer in both said mapped state and said not-mapped state, and respond differently to commands received from the host computer in said mapped state and said not-mapped state, respectively; and, wherein the storage system includes a plurality of storage devices and a storing control device that controls reading and/or writing of data targeted with respect to at east one data storage target logical volume in which mapping correspondence is established.

17. The virtualization method according to claim 16, wherein said access target virtual volume, includes a logical unit (LU), a logical device (LDEV) and a virtual volume (V-VOL), stacked in an order as stated, with said LU being more closely coupled to said host than said V-VOL.

* * * * *